United States Patent [19]

Delaney

[11] Patent Number: 4,852,832
[45] Date of Patent: Aug. 1, 1989

[54] DECORATIVE LIGHT STRIP HOLDER

[76] Inventor: John H. Delaney, 146-25 20th Rd., Whitestone, N.Y. 11357

[21] Appl. No.: 239,053

[22] Filed: Aug. 31, 1988

Related U.S. Application Data

[63] Continuation of Ser. No. 91,766, Aug. 31, 1987, abandoned.

[51] Int. Cl.$^4$ ............................................. F16L 3/08
[52] U.S. Cl. ..................................... 248/65; 211/26; 211/70.1; 248/314; 362/249; 362/391; 362/806; D26/25; D26/138
[58] Field of Search ............... 248/65, 314, 328, 74.2, 248/67.7, 315, 316.7, DIG. 9, DIG. 11, DIG. 12, 51; D13/25; D26/25, 138; 362/806, 382, 391, 392, 396, 810, 249, 252; 211/70.6, 70.1, 26, 89

[56] References Cited

U.S. PATENT DOCUMENTS

| 2,232,570 | 2/1941 | Spraragen | 49/479 |
| 3,275,818 | 9/1966 | Campbell | 362/249 |
| 4,244,014 | 1/1981 | VanEss | 362/249 |
| 4,357,653 | 11/1982 | Kovacs | 362/806 X |
| 4,521,838 | 6/1985 | Agabekov | 362/249 X |
| 4,588,153 | 5/1986 | Boston et al. | 248/74.2 |

FOREIGN PATENT DOCUMENTS 2143425 2/1985 United Kingdom ................. 211/26

Primary Examiner—Ramon S. Britts
Assistant Examiner—David L. Talbott

[57] ABSTRACT

There is disclosed a novel decorative light holder which includes means for retaining separate lights and intermediate wiring along straight and curvilinear paths including paths perpendicular to each other; and includes contact adhesive means to permit easy attachment on walls or other structures, such as window frames or adjacent interior or exterior wall structures.

2 Claims, 1 Drawing Sheet

U.S. Patent    Aug. 1, 1989    4,852,832
FIG. 1
FIG. 2
FIG. 3
FIG. 4
FIG. 5
FIG. 6
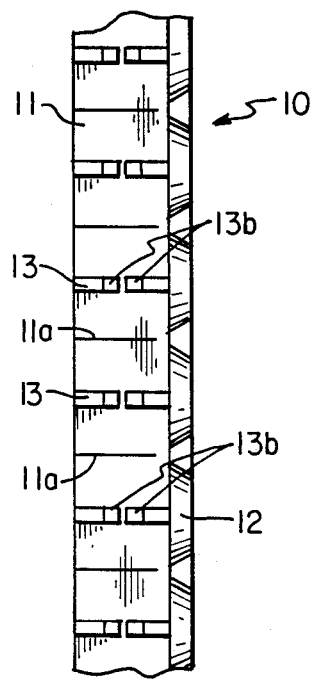
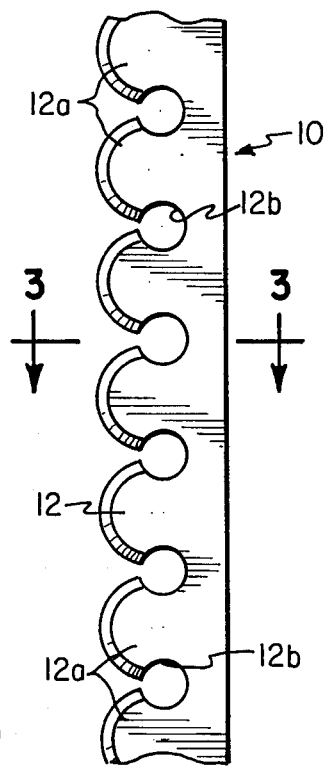
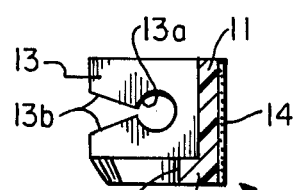
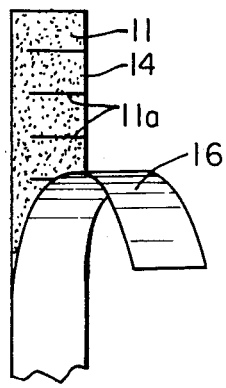
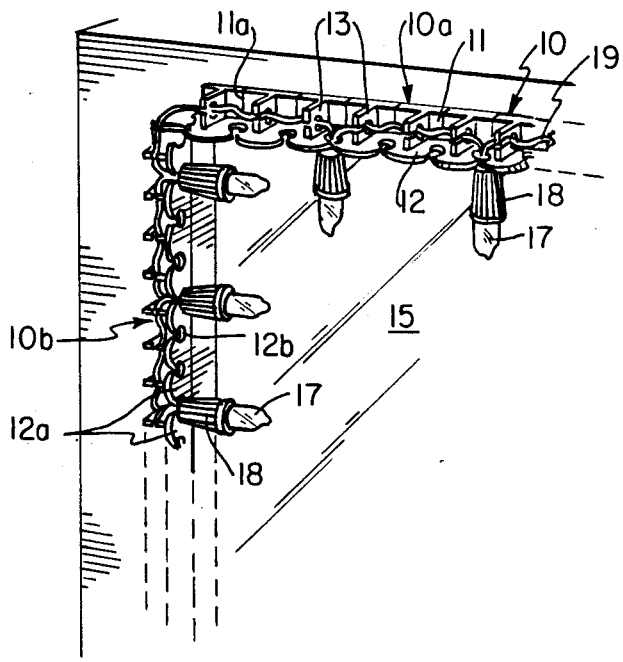
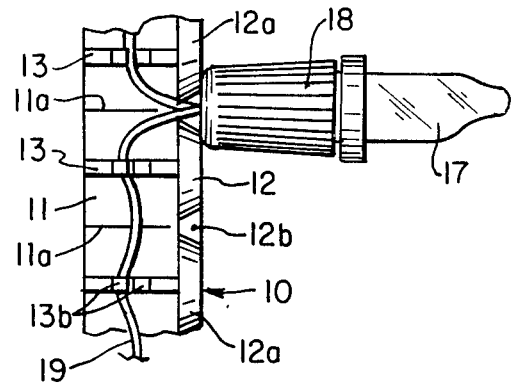

DECORATIVE LIGHT STRIP HOLDER

CROSS-REFERENCES TO RELATED APPLICATIONS

This application is a continuation of application Ser. No. 07/091,766 filed Aug. 31, 1987, now abandoned.

BACKGROUND OF THE INVENTION

The present invention concerns a molded plastic strip holder for decorative lights. More specifically, the holder of the present invention is adapted to receive a string of decorative lights, such as those typically used at Christmas or other festive occasions and to permit stringing of such lights without using supplementary fastening devices. The decorative light strip holder is constructed to have the ability to be curvylinear, so that individual letters of the alphabet may be made up in stringing decorative lights. The use of the decorative light strip holder also eliminates the practice of stapling the wires of a string of decorative lights to walls or window frames which can cause electrical short circuits and constitute a fire hazard. As will be seen from the following description certain unique features of the light holder strip lend themselves to easy installation of a string of lights around windows, doorway openings, etc.

SUMMARY OF THE INVENTION

The decorative light holder of the invention comprises an elongated plastic member consisting of two legs joined perpendicularly together. One of the legs defines spaced transverse slots extending inwardly from the outer edge, the inner end of each said slot ending as a circular opening. By this means, a series of bulb sockets forming part of a string of decorative lights may be held by inserting the base wires attached to each bulb socket into the slot and then sliding the wires toward the inner end of the slot. Immediately adjacent to each of the bulb socket retaining slots is a rectangular web which is perpendicular to each leg and which defines a slot leading to a centrally located circular opening which receives the electrical wire or wires inter-connecting adjacent bulb sockets. The leg-adjacent to the bulb socket retaining leg defines plurality of a transverse slots each of which is located intermediate a bulb socket retaining slot whose function is to permit the leg having such retaining slots to be bent, for example, at 90 with respect to itself in order to permit the lightbulb holder to "turn a corner"; for example, where it is desired to arrange and secure a string of decorative lights about a picture window. Further for this purpose, the holder includes an adhesive on the reverse side of the slitted leg, the adhesive being protected by a strip which can be peeled away immediately prior to application of the holder to the wall.

BRIEF DESCRIPTION OF DRAWING

FIG. 1 is a top view of the decorative lightbulb holder of the present invention partially broken away;

FIG. 2 is a side view of the holder of FIG. 1;

FIG. 3 is a cross-sectional view taken in the direction of arrows 3—3 of FIG. 2;

FIG. 4 is a view of the reverse side of the holder of FIG. 1 showing the application of adhesive thereto and a quick peel strip for exposing said adhesive;

FIG. 5 is a view of the holder of the present invention illustrating its use to mount a string of decorative lights about a picture window; and FIG. 6 is a detail of the arrangement shown in FIG. 5.

DESCRIPTION OF A PARTICULAR EMBODIMENT

Referring now to the drawing, a decorative light strip holder 10, constructed preferably of molded, non-brittle plastic in accordance with the present invention, has been illustrated. The light strip holder 10 is L-shaped in cross section having two legs 11 and 12. Extending between legs 11 and 12 are webs 13. The reverse, or the outside face of leg 11, is coated with a contact adhesive substance 14 which has a peelable covering strip 16. FIG. 2 illustrates the formation and construction of leg 12. The periphery of leg 12 has been formed to have a series of adjacent semi-circular sections 12a, adjacent ones connecting with circular openings 12b. Each of the webs 13 also defines circular openings 13a each respectively connected to a slot 13b. Furthermore, leg 11 has been formed to have a series of slits 11a which are, in the present embodiment, aligned with openings 12b in leg 12.

FIGS. 5 and 6 illustrate the application of the decorative light strip holder 10 to secure a string of decorative lights 17 around and immediately adjacent to the interior of a picture window 15. Each light is secured within a socket 18 which, in the present illustration, is attached to a continuous wire 19, sections of which interconnect respective sockets 18. In order to string the decorative lights, the light strip holder 10 is first secured by means of the contact adhesive on the outer surface of leg 11 to the wall or window frame immediately adjacent to the window. While other orientations are possible, in the particular illustration the leg 12 receives the wires connecting sockets 18 within openings 12b so that the bulbs 17 project into the window space. The function of webs 13 is to receive connecting wire sections 19 in slots 13b and openings 13a as shown in the illustration. It will be observed that the light strip holder 10 as secured in FIG. 5 has two sections 10a and 10b which are perpendicularly arranged about a corner of the window 15. The construction of the holder and the provision of slits 11a in leg 11 permit the holder to be arranged in the manner shown without the need to have separate sections. Slits 11a permit the arrangement of FIG. 5 or arranging the light strip holder to follow a curve if so desired.

It will be understood that the foregoing description has been of a particular embodiment and is merely representative of the invention. In order to fully appreciate the scope of the invention, reference should be made to the appended claims.

I claim:

1. A decorative light holder strip adapted to hold a string of decorative lights, light sockets and interconnecting electric wire means comprising an elongated member having two generally perpendicular flat legs connected along a common edge, one of said legs defining a plurality of spaced slots extending from the edge thereof toward the other leg, each slot being adapted to receive therein electric wire means connected to a light socket, a plurality of generally rectangular webs attached perpendicularly to each of said legs and located at regular intervals intermediate the socket wire receiving slots, each of said webs defining wire receiving slots and apertures coaxially arranged along the length of said members to permit the reception of wire means interconnecting a series of light sockets, and said second leg defining transverse slits to permit a curvilinear adjustment of said leg adjacent to a socket and bulb receiving slot.

2. The decorative light holder according to claim wherein said member is made of plastic having the characteristic that the slitted leg thereof may be bent without breaking.

* * * * *